United States Patent
Matsumoto et al.

(10) Patent No.: US 9,787,139 B2
(45) Date of Patent: Oct. 10, 2017

(54) WIRELESS POWER TRANSMISSION APPARATUS FOR PERFORMING NON-CONTACT TRANSMISSION BY ELECTROMAGNETIC INDUCTION

(71) Applicant: Panasonic Intellectual Property Management Co., Ltd., Osaka (JP)

(72) Inventors: Hiromu Matsumoto, Osaka (JP); Hiroshi Kanno, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 179 days.

(21) Appl. No.: 14/443,192

(22) PCT Filed: Apr. 11, 2014

(86) PCT No.: PCT/JP2014/002083
§ 371 (c)(1),
(2) Date: May 15, 2015

(87) PCT Pub. No.: WO2014/174785
PCT Pub. Date: Oct. 30, 2014

(65) Prior Publication Data
US 2015/0303742 A1  Oct. 22, 2015

(30) Foreign Application Priority Data
Apr. 22, 2013  (JP) ................................ 2013-089608

(51) Int. Cl.
*H01F 27/42* (2006.01)
*H02J 17/00* (2006.01)
(Continued)

(52) U.S. Cl.
CPC ............. *H02J 17/00* (2013.01); *H02J 5/005* (2013.01); *H02J 7/025* (2013.01); *H02J 50/12* (2016.02)

(58) Field of Classification Search
CPC .................................. H02J 5/005; H02J 17/00
(Continued)

(56) References Cited

U.S. PATENT DOCUMENTS 8,164,925 B2  4/2012 Abe et al.
8,947,041 B2  2/2015 Cook et al.
(Continued)

FOREIGN PATENT DOCUMENTS

CN   101937519   1/2011
JP   5-335811    12/1993
(Continued)

OTHER PUBLICATIONS

Office Action and Search Report issued Aug. 1, 2016 in Chinese Application No. 201480003047.1, with English translation.
(Continued)

*Primary Examiner* — Jared Fureman
*Assistant Examiner* — Duc M Pham
(74) *Attorney, Agent, or Firm* — Wenderoth, Lind & Ponack, L.L.P.

(57) ABSTRACT

A wireless power transmission apparatus is provided for performing non-contact transmission of power by electromagnetic induction, and includes a power transmitter performing frequency conversion; a power transmitting antenna; and a first resonance capacitor connected between the power transmitter and the power transmitting antenna, and resonating with the power transmitting antenna to pass the power transmission frequency of the power transmitter. The apparatus includes a power receiving antenna arranged to oppose the power transmitting antenna; a power receiver, and performing rectification and smoothing; and a second resonance capacitor connected between the power receiving antenna and the power receiver, and resonating with the power receiving antenna to pass the power transmission frequency of the power transmitter. The apparatus includes a filter connected between the second resonance capacitor and the power receiver, and reflecting higher harmonics generated by the power receiver.

5 Claims, 8 Drawing Sheets

(51) Int. Cl.
*H02J 5/00* (2016.01)
*H02J 7/02* (2016.01)
*H02J 50/12* (2016.01)

(58) Field of Classification Search
USPC ........................................................ 307/104
See application file for complete search history.

(56) References Cited

U.S. PATENT DOCUMENTS

| | | | |
|---|---|---|---|
| 2010/0033156 A1 | 2/2010 | Abe et al. | |
| 2010/0148723 A1* | 6/2010 | Cook | G06K 7/0008 320/108 |
| 2010/0195000 A1* | 8/2010 | Iikura | H03H 7/0153 348/731 |
| 2012/0165912 A1* | 6/2012 | Gray | A61B 5/0200 7 607/118 |

FOREIGN PATENT DOCUMENTS

| | | |
|---|---|---|
| JP | 4644827 | 3/2011 |
| JP | 2012-502612 | 1/2012 |

OTHER PUBLICATIONS

International Search Report issued May 20, 2014 in International (PCT) Application No. PCT/JP2014/002083.

Ronald J. Gutmann et al., "Power Combining in an Array of Microwave Power Rectifiers", IEEE Transactions Microwave Theory and Techniques, vol. MTT-27, No. 12, Dec. 1979.

English translations of the International Preliminary Report on Patentability and the Written Opinion of the International Searching Authority issued Nov. 5, 2015 in International (PCT) Application No. PCT/JP2014/002083.

* cited by examiner

WIRELESS POWER TRANSMISSION APPARATUS FOR PERFORMING NON-CONTACT TRANSMISSION BY ELECTROMAGNETIC INDUCTION

TECHNICAL FIELD

The present disclosure relates to a wireless power transmission apparatus for performing non-contact transmission of electric power by electromagnetic induction.

BACKGROUND ART

In recent years, a wireless power transmission technology has been paid attention as technologies for supplementing shortage of battery capacity in accordance with an increase in the power consumption due to improvements in the performances of functions and diversification of contents while a variety of mobile equipment inclusive of portable telephone has been widely used.

The wireless power transmission technology is required to have an ability to stably feed a variety of loads with power, or no-load dependency since neither the power consumption of the mobile equipment nor the load in each state of charge of the battery is constant upon transmitting electric power in a non-contact manner.

A non-contact power feed apparatus of such a configuration that the power transmitting antenna and the resonance capacitor on the power transmitting side are connected in series, and the power receiving antenna and the resonance capacitor on the receiving side are connected in parallel is disclosed as a wireless power transmission technology having such no-load dependency. The non-contact power feed apparatus can be operated as an ideal transformer depending on how to take the capacitance values of the resonance capacitors on the transmitting and receiving sides (See, for example, a Patent Document 1).

PRIOR ART DOCUMENT

Patent Document

Patent Document 1 Japanese Patent No. JP 4644827 B2

SUMMARY OF THE INVENTION

However, the background art has an insufficient disclosure about connection between the power receiving antenna and the power receiver for performing rectification, and in particular, has had a problem of an increase in the power consumption and a shortage of a heat radiation capability due to a deterioration in the rectification efficiency caused by higher harmonics generated in the switching operation of the power receiver.

An object of the present invention is to solve the problems of the aforementioned conventional example, and provide a wireless power transmission apparatus capable of highly efficient non-contact power feeding by reducing a rectification loss in the power receiver.

In order to solve the problems of the above-mentioned conventional example, there is provided a wireless power transmission apparatus of the present disclosure for performing non-contact transmission of power by electromagnetic induction. The wireless power transmission apparatus includes a power transmitter configured to perform frequency conversion; a power transmitting antenna connected to the power transmitter; and a first resonance capacitor connected between the power transmitter and the power transmitting antenna, and resonating with the power transmitting antenna so as to pass the power transmission frequency of the power transmitter. The wireless power transmission apparatus includes a power receiving antenna arranged to oppose the power transmitting antenna; a power receiver connected to the power receiving antenna, the power receiver performing rectification and smoothing; and a second resonance capacitor connected between the power receiving antenna and the power receiver, and resonating with the power receiving antenna so as to pass the power transmission frequency of the power transmitter. The wireless power transmission apparatus includes a filter connected between the second resonance capacitor and the power receiver, the filter reflecting higher harmonics generated by the power receiver.

According to the present disclosure, a wireless power transmission apparatus can be provided that is capable of highly efficient non-contact power feeding by reducing the rectification loss in the power receiver.

DETAILED DESCRIPTION OF THE INVENTION

Figure 1:
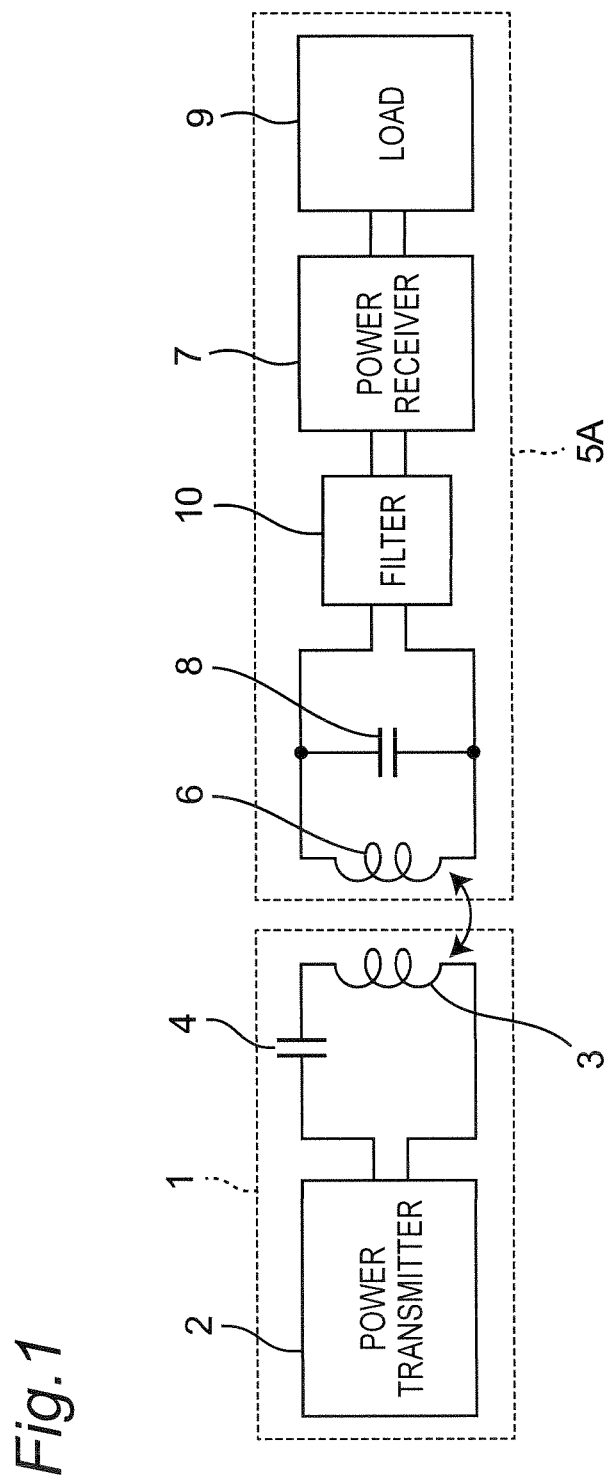
FIG. 1 is a block diagram of a wireless power transmission apparatus according to a first embodiment of the present disclosure.

Hereinafter, embodiments according to the present disclosure will be described with reference to the drawings. In each of the following embodiments, like constituent elements are denoted by identical reference numerals.

First Embodiment

Figure 8:
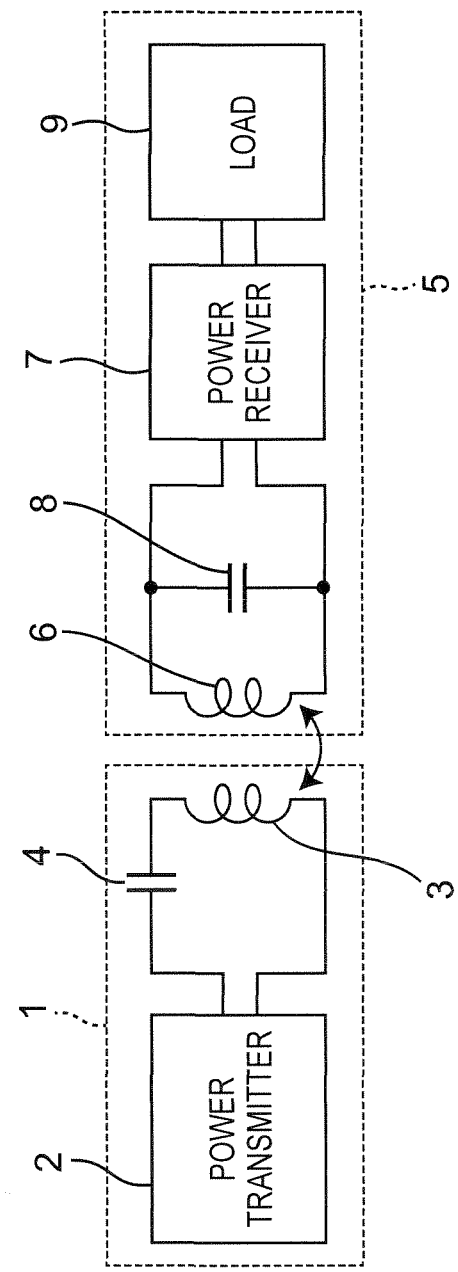
FIG. 8 is a block diagram of a wireless power transmission apparatus according to a comparative example.

FIG. 8 is a block diagram of a wireless power transmission apparatus according to a comparative example. Referring to FIG. 8, the wireless power transmission apparatus transmits power from a power transmission apparatus 1 to a power receiver apparatus 5 in a non-contact manner. In this case, the power transmission apparatus 1 is configured to include a power transmitter 2 that performs frequency conversion from, for example, a direct current to an alternating current, a power transmitting antenna 3 that transmits the power, and a resonance capacitor 4 connected in series between the power transmitter 2 and the power transmitting antenna 3. Moreover, the power receiver apparatus 5 is configured to include a power receiving antenna 6 that receives the power, a power receiver 7 that performs rectification, a resonance capacitor 8 connected in parallel between the power receiving antenna 6 and the power receiver 7, and a load 9. In this case, the load 9 represents a power consumed by the electronic equipment on which the power receiver apparatus is mounted as a load. The load 9 may be replaced with a battery.

The power transmission apparatus 1 transmits the power from the power transmitter 2 at a frequency in the vicinity of a resonance frequency by the power transmitting antenna 3 and the resonance capacitor 4, and a resonance frequency by the power receiving antenna 6 and the resonance capacitor 8. Non-contact transmission of the power from the power transmitting antenna 3 to the power receiving antenna 6 is performed by electromagnetic induction. On the other hand, the power receiver apparatus 5 performs rectification and smoothing of alternate-current power received by the receiving antenna 6 of the power receiver 7, and supplies a dc power to the load 9. Although any a DC/DC converter is not shown in the Figure, a DC/DC converter may be inserted between the power receiver 7 and the load 9. With this arrangement, a power of a constant voltage can be supplied to the load 9 depending on neither the coupling coefficient of the transmitting and receiving antennas nor the impedance of the load.

In the wireless power transmission apparatus as described above, it is important how highly efficiently the power is transmitted. In particular, a majority of equipment on which the power receiver apparatus 5 is mounted is equipment which is required to be reduced in size, such as mobile equipment and vehicles, and therefore, it is required to reduce the rectification loss at the power receiver 7 as far as possible and to simplify the heat radiation structure.

However, in such a wireless power transmission apparatus that the series resonance capacitor 4 is provided on the power transmission apparatus 1 side and the parallel resonance capacitor 8 is provided on the power receiver apparatus 5 side, the output impedance of the antenna when the power receiving antenna 6 is viewed from the input terminal of the power receiver 7 enters approximately a capacitive short-circuited state at a high frequency. As a result, higher harmonics generated during the rectification at the power receiver 7 are reflected by the impedance approximately in the capacitive short-circuited state, and are returned to the power receiver 7. The impedance approximately in the capacitive short-circuited state is not the optimal impedance with which the efficiency of the power receiver 7 is maximized.

Accordingly, in the present embodiment, as shown in FIG. 1, a filter 10 is inserted in the foremost stage of the power receiver 7 of a power receiver apparatus 5A between the power receiver 7 and the resonance capacitor 8 to arbitrarily design the output impedance at higher harmonics in the filter 10, and this leads to provision of an input impedance at higher harmonics to the power receiver to maximize the rectification efficiency.

FIG. 1 is a block diagram of the wireless power transmission apparatus according to a first embodiment of the present disclosure. It is noted that the components of the configurations similar to those of FIG. 8 are denoted by identical reference numerals, and no description is provided for them.

The filter 10 has such a characteristic that reflects higher harmonics generated during the rectification at the power receiver 7 with an arbitrary impedance. In this case, the power transmitter 2 generally performs transmission of power by a square wave. The square wave is configured to includes odd-order higher harmonics with a fundamental wave, and the higher harmonic of the highest level is the third harmonic wave. Therefore, regarding the characteristic of the filter 10, its effect can be sufficiently obtained merely by reflecting the third harmonic wave with an arbitrary impedance. The third harmonic impedance of the filter 10 that reduces the rectification loss is described below.

Figure 2:
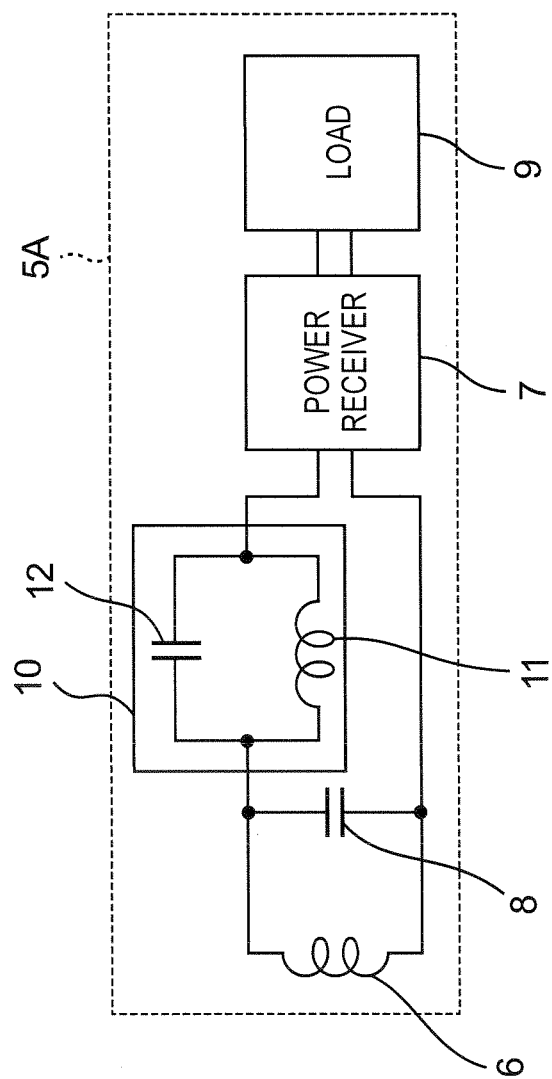
FIG. 2 is a block diagram showing a detail of a filter of a power receiver apparatus of the wireless power transmission apparatus of FIG. 2.

FIG. 2 is a block diagram of a power receiver apparatus 5A whose detailed configuration of the filter 10 of FIG. 1 is shown. Referring to FIG. 2, such a band element filter, that a parallel LC resonance circuit configured to include an inductor 11 and a capacitor 12 is connected in series between the capacitor 8 and the power receiver 7, is used as the filter 10 of FIG. 1. In this case, it is comparatively easy to provide a characteristic that exerts less influence on the fundamental wave, and then, reflects only the higher harmonics by selecting the inductance value of the inductor 11 at a value smaller than the inductance value of the power receiving antenna 6, and it is possible to design the output impedance at the higher harmonics of the filter 10 to an arbitrary phase depending on the capacitance value of the capacitor 12.

Figure 3A:
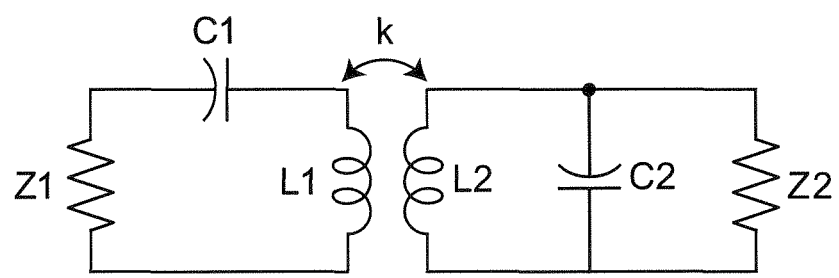
FIG. 3A is a circuit diagram used for simulating an output impedance of the filter of FIG. 2, showing a detailed configuration of transmitting and receiving antenna parts according to the comparative example of FIG. 8.
Figure 3B:
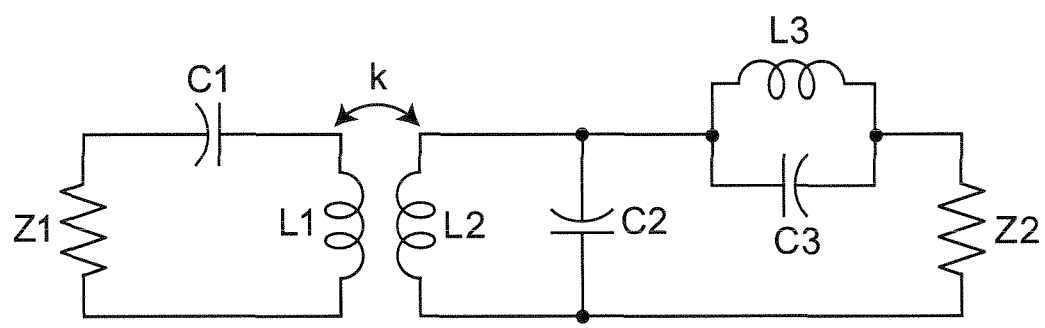
FIG. 3B is a circuit diagram used for simulating the output impedance of the filter of FIG. 2, showing a detailed configuration of the transmitting and receiving antenna parts according to the first embodiment of FIG. 1.

FIGS. 3A and 3B are circuit diagrams used for simulating the output impedance of the filter 10, where FIG. 3A shows the circuit diagram of transmitting and receiving antenna parts of a comparative example without any filter 10, and FIG. 3B shows the circuit diagram of the transmitting and receiving antenna parts with the filter 10 of the present first embodiment.

In the circuit of the comparative example of FIG. 3A, the I/O impedances Z1 and Z2 are assumed to be 50Ω, respectively, the first resonance capacitor 4 (C1) is assumed to be 10.007 nF, the inductor L1 of the power transmitting antenna 3 is assumed to be 50 μH, the inductor L2 of the power receiving antenna 6 is assumed to be 8 μH, the second resonance capacitor 8 (C2) is assumed to be 50.661 nF, the coupling coefficient between the power transmitting and receiving antennas 3 and 6 is assumed to be 0.4, and the transmission frequency is assumed to be 250 kHz. In the circuit of the present first embodiment of FIG. 3B, the inductor 11 (L3) of the filter 10 is assumed to be 1 μH, and the capacitor 12 (C3) of the filter 10 is assumed to be 41.211 nF in addition to the circuit of the aforementioned comparative example.

Figure 4:
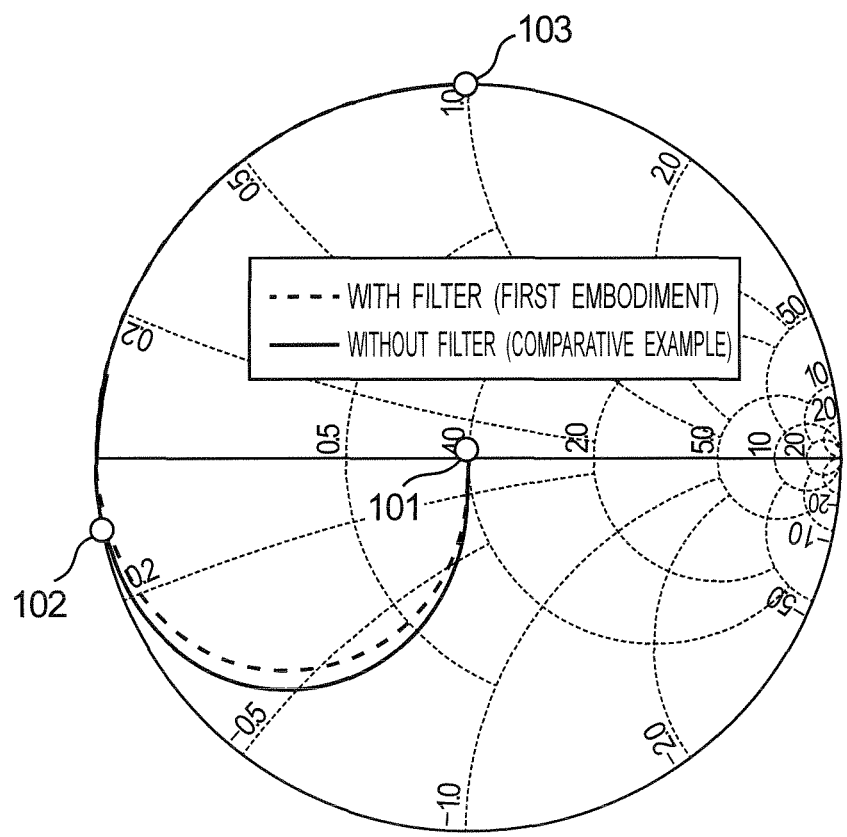
FIG. 4 is a Smith chart showing simulation results of circuits of FIGS. 3A and 3B.

FIG. 4 shows simulation results of output impedances of the circuits of FIGS. 3A and 3B by a Smith chart. As apparent from FIG. 4, it is designed that there is a large difference between the third harmonic impedance 102 without the filter and the third harmonic impedance 103 with the filter regarding the third harmonic impedance in contrast to the fact that almost same impedance 101 is provided regarding the fundamental wave impedance with regard to whether or not the filter is provided. It is possible to design an arbitrary phase depending on how to take the LC parameters of the filter. On the other hand, the third harmonic impedance of the circuit without the filter is located in the vicinity of capacitive short circuit, and the impedance near this value is achieved regardless of which LC values are taken so long as this circuit configuration is concerned.

Figure 5:
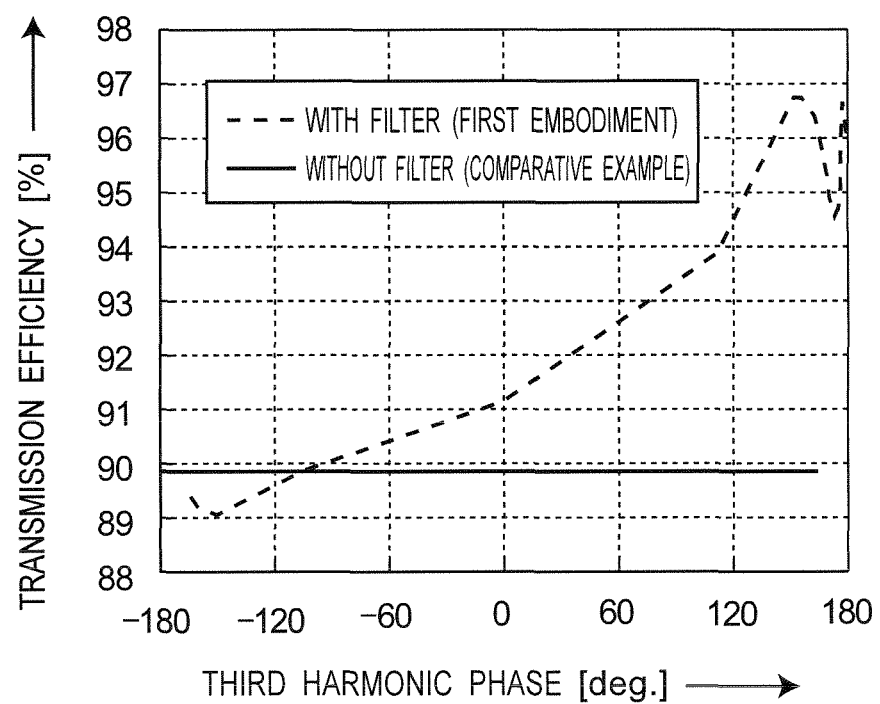
FIG. 5 is a graph showing simulation results of a transmission efficiency of the wireless power transmission apparatus when a phase of a third harmonic is swept in a range of 360 degrees in the circuits of FIGS. 3A and 3B, showing a transmission efficiency with respect to the phase of the third harmonic.

FIG. 5 shows simulation results of a transmission efficiency of the wireless power transmission apparatus when the phase of the third harmonic is swept in a range of 360 degrees in the circuits of FIGS. 3A and 3B. As apparent from FIG. 5, it can be understood that the efficiency is increased as compared with that in the case of no filter within a range of −90 to +180 degrees of the phase of the third harmonic in the present first embodiment. Moreover, an efficiency improvement of equal to or larger than 1% is observed within a range of +0 to +180 degrees, and an efficiency improvement of equal to or larger than 3% is observed within a range of +90 to +180 degrees. It can be understood that the rectification efficiency of the power receiver 7 is improved by designing the phase of the third harmonic within this range. Although a D class full bridge circuit is used for the power transmitter 2 and a diode full bridge circuit is used for the power receiver 7 of the present first embodiment, the effects of the present disclosure are not limited to this.

Second Embodiment

Figure 6:
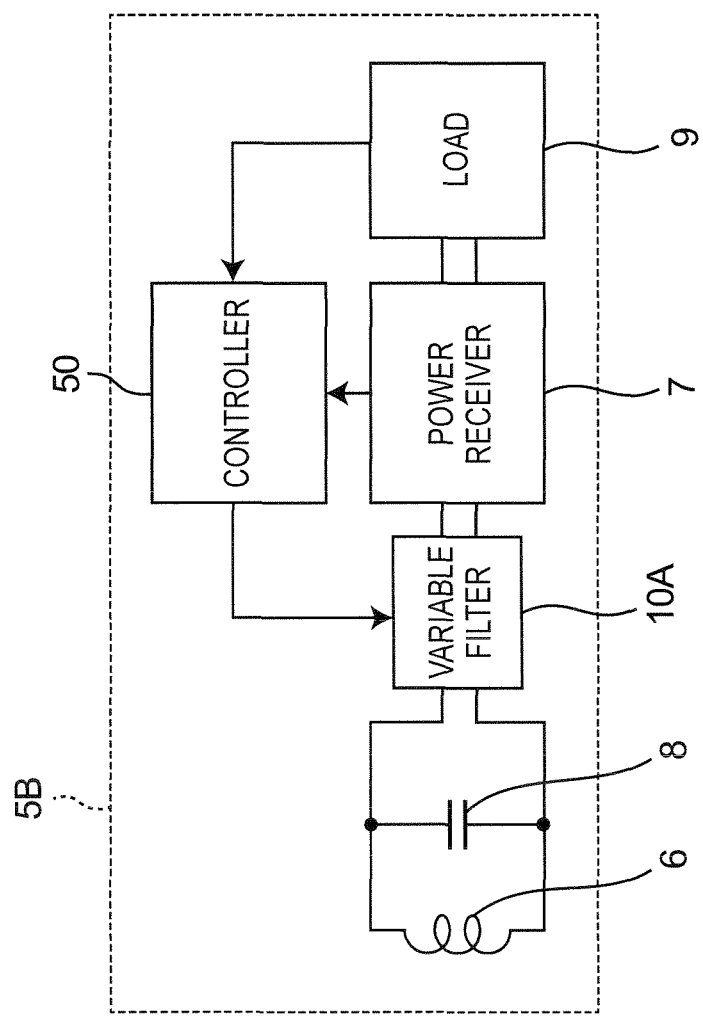
FIG. 6 is a block diagram of a power receiver apparatus according to a second embodiment of the present disclosure.

FIG. 6 is a block diagram of a power receiver apparatus according to a second embodiment of the present disclosure. It is noted that configurations similar to those of FIG. 1 are denoted by identical reference numerals, and no description is provided for them.

As shown in FIG. 5, the transmission efficiency becomes maximized by designing the power receiver apparatus so that the phase of the third harmonic of the output impedance of the filter becomes within the range of +90 to +180 degrees. However, the phase of the third harmonic sometimes deviates from the designed value due to a change in the load in operation. In such a case, by comparison to the receiver apparatus 5A of FIG. 2, the power receiver apparatus 5B of FIG. 6 is characterized in that:

(1) the filter 10 is replaced with a variable filter 10A; and
(2) a controller 50 configured by, for example, a digital computer, CPU, MPU or the like is further provided.

The variable filter 10A has such a characteristic that reflects higher harmonics generated during the rectification at the power receiver 7 with an arbitrary impedance, and has a function to vary the impedance to reflect the higher harmonics. The controller 50 obtains load information from the load 9 or the power receiver 7. By adjusting the variable filter 10A so that the output impedance of the variable filter 10A falls within the range of +90 to +180 degrees on the basis of the obtained load information, highly efficient power transmission can be consistently achieved for a wide variety of load.

Figure 7:
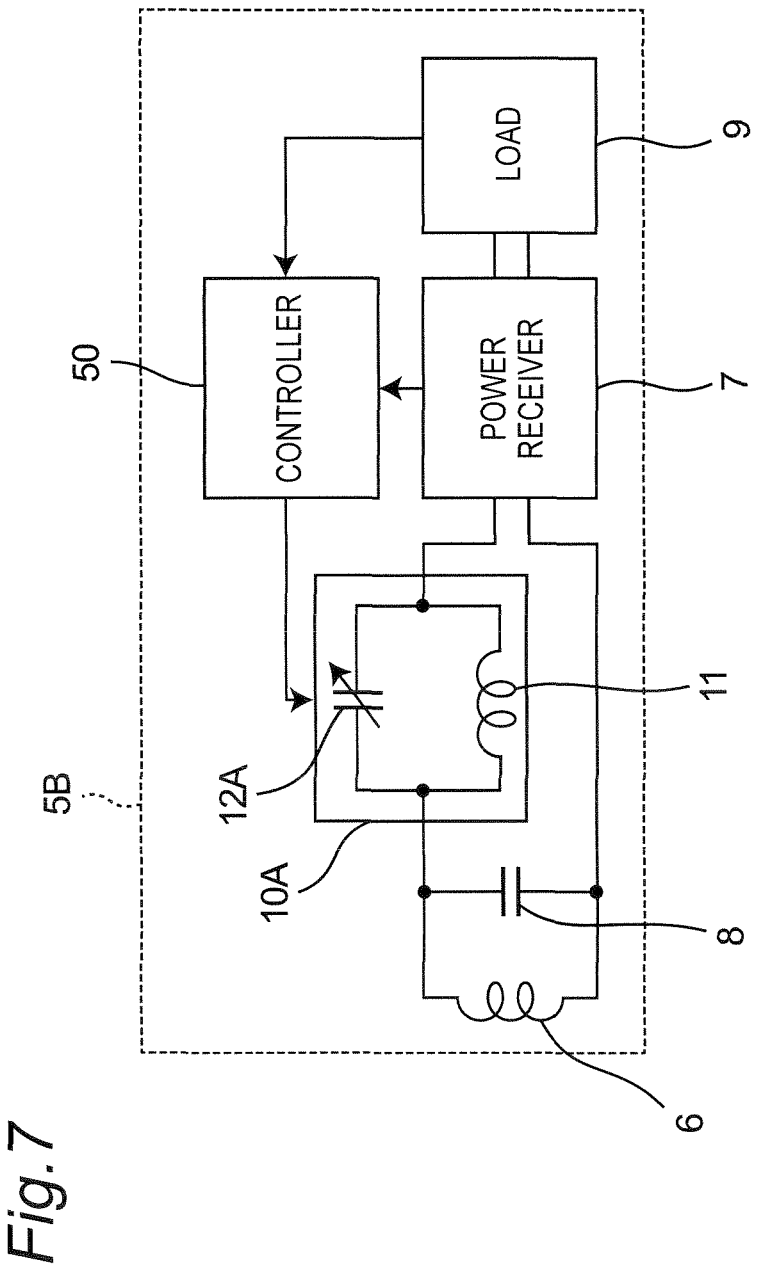
FIG. 7 is a block diagram showing a detail of a variable filter of the power receiver apparatus of FIG. 6.

FIG. 7 is a block diagram of a power receiver apparatus 5B whose detailed configuration of the variable filter 10A of FIG. 6 is shown. Referring to FIG. 7, such a band element filter that a parallel LC resonance circuit configured to include the inductor 11 and a variable capacitor 12A is connected in series between the capacitor 8 and the power receiver 7 is used as the variable filter 10A of FIG. 6. In this case, by changing the capacitance value of the variable capacitor 12A, the phase of the output impedance of the variable filter 10A can be adjusted within the range of +90 to +180 degrees, and highly efficient power transmission can be achieved also in a wide variety of load conditions.

The embodiments disclosed this time are illustrative and not limited in all aspects. The scope of the present disclosure is expressed by not the aforementioned description but the claims for patent, and it is intended that all alterations in the meaning and scope equivalent to the scope of the claims for patent are included.

SUMMARY OF EMBODIMENTS

According to a first aspect of the present disclosure, there is provided a wireless power transmission apparatus for performing non-contact transmission of power by electromagnetic induction. The wireless power transmission apparatus includes a power transmitter performing frequency conversion; a power transmitting antenna connected to the power transmitter; and a first resonance capacitor connected between the power transmitter and the power transmitting antenna, the first resonance capacitor resonating with the power transmitting antenna so as to pass the power transmission frequency of the power transmitter. The wireless power transmission apparatus includes a power receiving antenna arranged to oppose the power transmitting antenna; a power receiver connected to the power receiving antenna, and performing rectification and smoothing; and a second resonance capacitor connected between the power receiving antenna and the power receiver, and resonating with the power receiving antenna so as to pass the power transmission frequency of the power transmitter. The wireless power transmission apparatus includes a filter connected between the second resonance capacitor and the power receiver, and reflecting higher harmonics generated by the power receiver.

According to a wireless power transmission apparatus of a second aspect of the present disclosure, in the wireless power transmission apparatus of the first aspect of the present disclosure, the filter reflects a third harmonic generated by the power receiver with an impedance of any phase of −90 degrees to +180 degrees.

According to a wireless power transmission apparatus of a third aspect of the present disclosure, in the wireless power transmission apparatus of the first aspect of the present disclosure, the filter reflects a third harmonic generated by the power receiver with an impedance of any phase of +0 degrees to +180 degrees.

According to a wireless power transmission apparatus of a fourth aspect of the present disclosure, in the wireless power transmission apparatus of the first aspect of the present disclosure, the filter reflects a third harmonic generated by the power receiver with an impedance of any phase of +90 degrees to +180 degrees.

According to a wireless power transmission apparatus of a fifth aspect of the present disclosure, in the wireless power transmission apparatus of any one of the first to fourth aspects of the present disclosure, the first resonance capacitor is connected in series with the power transmitting antenna, and the second resonance capacitor is connected in parallel with the power receiving antenna.

According to a wireless power transmission apparatus of a sixth aspect of the present disclosure, in the wireless power transmission apparatus of the first to fifth aspects of the present disclosure, the filter is provided by connecting a band stop filter, which is configured by parallel connection of an inductor and a capacitor, in series between the second resonance capacitor and the power receiver.

According to a wireless power transmission apparatus of a seventh aspect of the present disclosure, in the wireless power transmission apparatus of the first to sixth aspects of the present disclosure, the filter is able to change a phase of impedance with respect to a third harmonic generated by the power receiver.

According to a wireless power transmission apparatus of an eighth aspect of the present disclosure, in the wireless power transmission apparatus of the seventh aspect of the present disclosure, the filter is provided by connecting a band stop filter, which is configured by parallel connection of an inductor and a capacitor having a variable capacitance, in series between the second resonance capacitor and the power receiver.

As mentioned above in detail, according to the present disclosure, a wireless power transmission apparatus can be provided that is capable of highly efficient non-contact power feeding by reducing the rectification loss in the power receiver.

REFERENCE NUMERICALS

1: power transmission apparatus
2: power transmitter
3: power transmitting antenna
4: resonance capacitor
5, 5A, and 5B: power receiver apparatus
6: power receiving antenna
7: power receiver
9: load
10: filter
10A: variable filter
11: inductor
12: capacitor
12A: variable capacitor
50: controller
101: fundamental wave impedance
102: third harmonic impedance without filter
103: third harmonic impedance with filter

The invention claimed is:

1. A wireless power transmission apparatus for performing non-contact transmission of power by electromagnetic induction, the wireless power transmission apparatus comprising:
   a power transmitter configured to perform frequency conversion;
   a power transmitting antenna connected to the power transmitter;
   a first resonance capacitor connected between the power transmitter and the power transmitting antenna, the first resonance capacitor resonating with the power transmitting antenna so as to pass the power transmission frequency of the power transmitter;
   a power receiving antenna arranged to oppose the power transmitting antenna;
   a power receiver connected to the power receiving antenna, the power receiver performing rectification and smoothing;
   a second resonance capacitor connected between the power receiving antenna and the power receiver, the second resonance capacitor resonating with the power receiving antenna so as to pass the power transmission frequency of the power transmitter; and
   a filter connected between the second resonance capacitor and the power receiver, the filter reflecting higher harmonics generated by the power receiver,
   wherein the filter reflects a third harmonic generated by the power receiver with an impedance of any phase of +90 degrees to +180 degrees.

2. The wireless power transmission apparatus as claimed in claim 1,
   wherein the first resonance capacitor is connected in series with the power transmitting antenna, and
   wherein the second resonance capacitor is connected in parallel with the power receiving antenna.

3. The wireless power transmission apparatus as claimed in claim 1,
   wherein the filter is provided by connecting a band stop filter, which is configured by parallel connection of an inductor and a capacitor, in series between the second resonance capacitor and the power receiver.

4. The wireless power transmission apparatus as claimed in claim 1,
   wherein the filter is able to change a phase of impedance with respect to a third harmonic generated by the power receiver.

5. The wireless power transmission apparatus as claimed in claim 4,
   wherein the filter is provided by connecting a band stop filter, which is configured by parallel connection of an inductor and a capacitor having a variable capacitance, in series between the second resonance capacitor and the power receiver.

* * * * *